United States Patent [19]

Fishman

[11] Patent Number: 5,036,181

[45] Date of Patent: Jul. 30, 1991

[54] METHOD AND APPARATUS FOR SUPPLYING AND CONTROLLING POWER TO A RESISTANCE FURNACE

[75] Inventor: Oleg Fishman, Maple Glen, Pa.

[73] Assignee: Inductotherm Corp., Rancocas, N.J.

[21] Appl. No.: 483,186

[22] Filed: Feb. 22, 1990

[51] Int. Cl.⁵ .............................................. H05B 1/02
[52] U.S. Cl. .................................... 219/497; 219/501; 219/508; 219/506; 307/48
[58] Field of Search ............... 219/486, 490, 491, 492, 219/494, 497, 501, 506; 307/64, 35, 67, 48, 46

[56] References Cited

U.S. PATENT DOCUMENTS

| 3,784,841 | 1/1974 | Hosaka | 307/85 |
| 4,317,056 | 2/1982 | Alberts | 307/64 |
| 4,566,803 | 1/1986 | Waniisi et al. | 307/64 |
| 4,709,200 | 11/1987 | Ochiai | 307/64 |

Primary Examiner—M. H. Paschall
Attorney, Agent, or Firm—Seidel, Gonda, Lavorgna & Monaco

[57] ABSTRACT

Power is controllably supplied to a resistive load. Power is passed from a power supply through a selectably operable switch directly to the resistive load and simultaneously to an energy storage device in parallel with the load. After a predetermined interval, the energy storage means causes the switch to open, thus causing the energy stored in the energy storage means to be transferred to the load. The switch is periodically closed according to a predetermined frequency.

12 Claims, 4 Drawing Sheets

METHOD AND APPARATUS FOR SUPPLYING AND CONTROLLING POWER TO A RESISTANCE FURNACE

FIELD OF THE INVENTION

The present invention relates to controlling the power delivered to a resistance furnace, or any other electrical heater, by varying the frequency of current pulses delivered to the resistance element.

BACKGROUND OF THE INVENTION

A resistance furnace generates heat by passing electrical energy through a resistance element. The resistance element is typically of high resistance, so as to produce a large amount of heat when electrical energy is flowing through it. Resistance furnaces are often used in metal smelting.

One type of power supply often used for a resistance furnace provides energy to the resistance element in the form of a series of power pulses. Each pulse carries a quantum of energy which maintains a constant amplitude current for a fixed period, at a given load resistance and line voltage. This type of power supply has a number of advantages over other types, such as: better accuracy of control, lower cost, low harmonic distortion on the power line, and the fact that the energy to the furnace may be isolated from the control equipment, thus minimizing the risk of endangering the operator. The power to the furnace can be controlled by varying the frequency of the pulses.

One object of the present invention is to provide a power supply for a resistance furnace which provides a novel way of controlling the frequency of pulses to the resistance element.

Another object of the present invention is to provide a power supply for a resistance furnace in which the frequency of pulses in controlled by external parameters such as load voltage and current, element temperature, and furnace temperature.

Other objects will appear hereinafter.

SUMMARY OF THE INVENTION

The present invention is a method and apparatus for controlling the power supplied to a resistive load. Power from a power supply is passed directly to the resistive load and simultaneously to energy storage means external to the load. The power being supplied directly to the load is interrupted after a predetermined interval and the energy stored in the energy storage means is substantially immediately transferred to the load.

In a preferred embodiment of the invention, the power is interrupted by a switching means, preferably but not necessarily a silicon-controlled rectifier (SCR), and the energy storing means includes an inductor-capacitor (LC) network in parallel with the load. When the SCR is activated, the direct current from the power supply flows into the resistive load and charges the capacitor via the inductor. Due to the oscillatory nature of the LC network, the charging current has sine wave form, the period of which is determined by the values of the inductor and capacitor. In the first half of a period, the current in the LC network coincides with the current in the load. In the second half of the period the current in the LC network is opposite that in the load. The current in the SCR is equal to the sum of the currents in the load and in the LC network. The LC components are selected such that the amplitude of the oscillatory current is larger than the maximum load current. Therefore, in the second half of the period, this sum becomes negative. The negative current flow shuts off the SCR, and the remainder of the energy in the LC network discharges into the resistive load.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
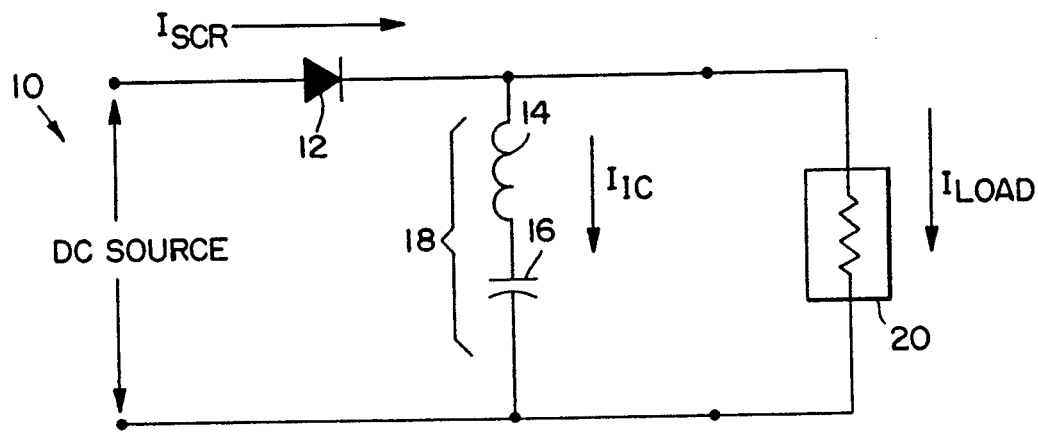
FIG. 1 is a simplified diagram showing the principle of operation of the present invention.
Figure 2:
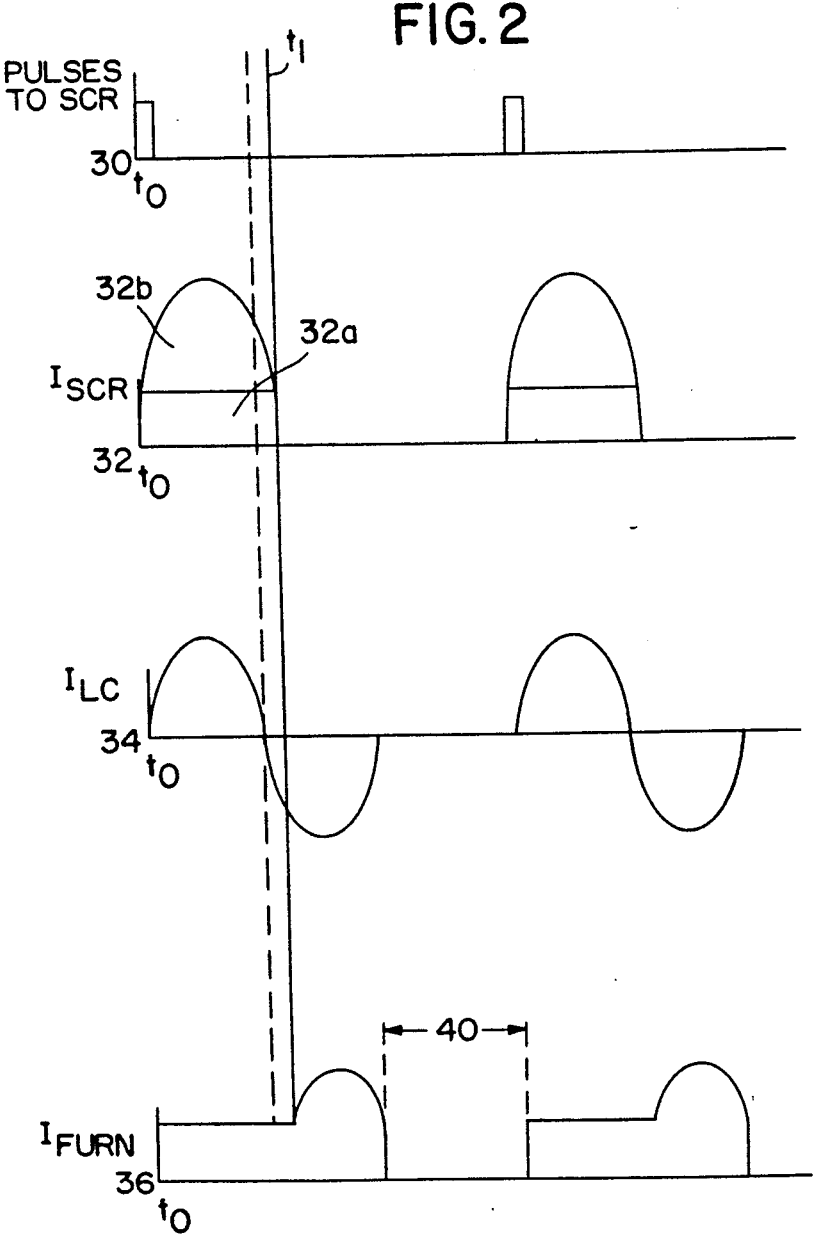
FIG. 2 is a series of waveforms illustrating the principle of operation of the present invention.

FIG. 1 is a simplified diagram showing the invention in schematic form, and FIG. 2 shows a series of waveforms associated with particular points in the circuit of FIG. 1 over the course of two cycles of operation.

Circuit 10 of FIG. 1 includes a switch, here shown as a silicon-controlled rectifier (SCR) 12, an inductor 14, and a capacitor 16. The inductor 14 and capacitor 16 are energy storage devices and are connected in series in one branch of a parallel circuit, referred to as LC network 18. Circuit 10 further comprises a resistance load 20, which may be a resistance element in a furnace, connected in a second parallel branch of the circuit. The input terminals of circuit 10 are supplied by DC voltage, and SCR 12 is operatively associated with an external control (not shown in FIG. 1) which fires the SCR 12 to render it conductive.

The cycle of operation begins when the external control sends a firing pulse to the SCR 12. A typical firing pulse is shown by waveform 30 in FIG. 2. When fired, SCR 12 will begin to conduct current from its anode to its cathode.

Firing SCR 12 permits a direct current from the DC source to flow through it, as shown in waveform 32 of FIG. 2. SCR 12 is fired at time $t_0$. A portion of the current through SCR 12 flows directly through the resistance load 20, and the rest flows through LC network 18. The current in the LC network 18 is shown by waveform 34 in FIG. 2, and the current through the resistance load 20 is shown by waveform 36. For the first half cycle, current through the SCR (waveform 32) is the sum of the current through the resistance load 20 (waveform 36, which is the same as $32a$), and the current through the LC network 18 (waveform 34, which has the same magnitude as $32b$). The current through LC network 18 is sinusoidal because, under initial conditions where the current in the inductor 14 and the voltage across the capacitor 16 are both at zero, neither voltage nor current in the LC network 18 can change immediately when the SCR 12 is fired. When the SCR 12 is fired, current in the LC network 18 begins to flow and increases sinusoidally. Capacitor 16 begins to charge. The current through the resistance load 20 is constant.

As the capacitor 16 charges, current flow through the inductor 14 decreases. Energy stored in the magnetic field surrounding the inductor 14 is released. As current flow decreases, a voltage develops across the terminals of inductor 14. This voltage aids the current flow, and further charges capacitor 16. The capacitor 16 will continue to charge until the inductor 14 releases all of its energy. At this time, the capacitor 16 will be charged to approximately twice the applied DC voltage applied across the input terminals. When the capacitor 16 is charged, and the voltage across capacitor 16 is greater than the applied DC voltage, current will begin flowing in the reverse direction out of the LC circuit.

This condition is illustrated graphically at time $t_1$ in FIG. 2. At $t_1$, the capacitor 16 is fully charged, and the current in the LC circuit has dropped to zero. After $t_1$, the LC circuit current 34 becomes negative (i.e., charges direction) and flows back through the SCR 12 (from the cathode to the anode). This backward flow causes the SCR to turn off, and so the current through the SCR (waveform 32) returns to zero at time $t_1$, (ignoring, for present purposes, the finite but negligible turn-off time of an SCR). Once SCR 12 is off, current can no longer flow back through the SCR and instead must flow through resistance load 20. Once SCR 12 turns off, the energy stored in capacitor 16 now flows through resistance load 20, shown by the portion of waveform 36 following time $t_1$. The impedance of the LC network 18 is selected so that the current in the LC network 18 is 1½ to 2 times greater than the largest likely steady-state current through the resistance load 20.

When the capacitor 16 has discharged completely, bringing the LC circuit current 34 back to zero, the circuit 10 is once again at its initial conditions, with SCR 12 off and no current flowing in the circuit 10. However, after a delay period 40, the control system once again fires the SCR 12 with a firing pulse 30a and the cycle repeats.

This method of providing pulses to the resistance load 20 has certain advantages over other ways of providing a sequence of current pulses. First, each pulse to the resistance load 20 is initiated simply by providing a small-signal firing pulse to the SCR 12. Since pulses to an SCR are small-signal, no large currents or voltages need be present in the control system, thus making the system safer for an operator. Second, the combination of inductor and capacitor in LC network 18 will have a specific time constant associated with it, depending on the inductance and capacitance values chosen, and this time constant can be used to determine the duration of each pulse to the resistance load 20. Because the control system need not directly turn the SCR off to turn the power pulse off, the control system is simpler and safer.

The total energy supplied to the resistance load 20 on average is determined by the frequency of power pulses to the load. The higher the frequency, the greater the average power. This frequency is determined by means of control and limit systems, responding to measurements of certain parameters, as will be explained below.

Figure 3:
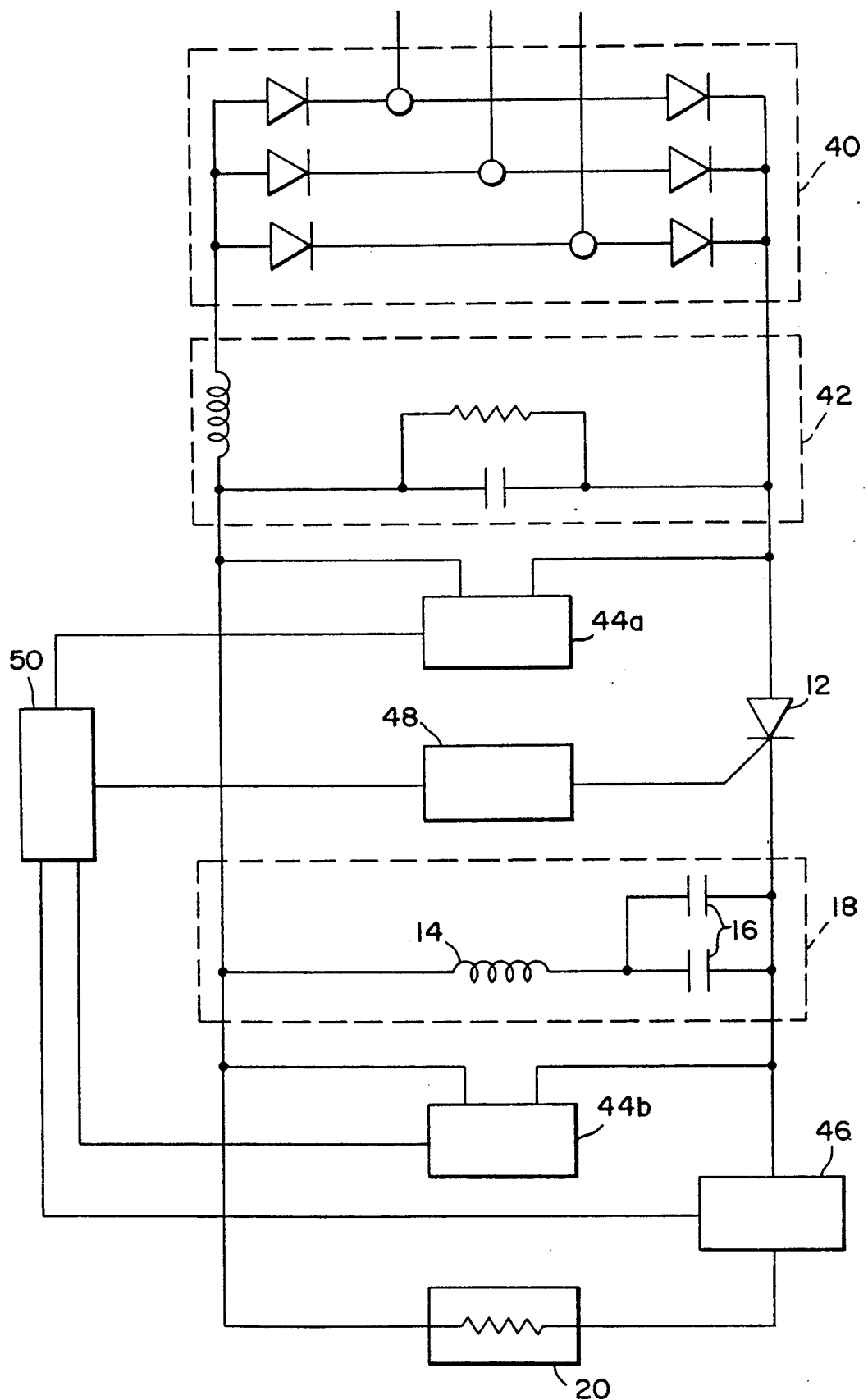
FIG. 3 is a schematic diagram showing one configuration of a control system according to the present invention in a resistance furnace.

FIG. 3 shows a more detailed version of the circuit shown in FIG. 1, which is usable in practical applications such as melting metals. Commercial, high-voltage three-phase alternating current is fed into full-bridge rectifier 40. This current must be converted into high-voltage DC before it is switched to the load. In typical metallurgical applications, the DC voltage into the circuit can be as high as 800 volts. The output from rectifier 40 is then filtered by filter 42.

LC network 18 is shown in FIG. 3 as having an inductor 14 and a plurality of individual capacitors 16. As is known in the art, any combination of inductors or capacitors, in series or parallel, can be combined to yield the desired characteristics, such as desired impedance and time constant, for the LC network 18.

The circuit of FIG. 3 also comprises two voltage sensors 44a and 44b. These voltage sensors are connected in parallel with the circuit. Sensor 44a is located across the input to determine the voltage through the input terminals of the circuit. Sensor 44b is connected across the resistance load 20 to determine the voltage across the load itself. Connected in series with the resistance load 20 is current sensor 46, which detects the current through the load 20. Current sensor 46 preferably but not necessarily utilizes a Hall effect transducer.

Sensors 44a, 44b and 46 all feed voltage or current measurements to a control module 50, which will be described in detail below. Between the control module 50 and the SCR 12 is firing module 48. Firing module 48 fires the SCR 12 in response to a signal from control module 50 and is explained in detail below.

Figure 4:
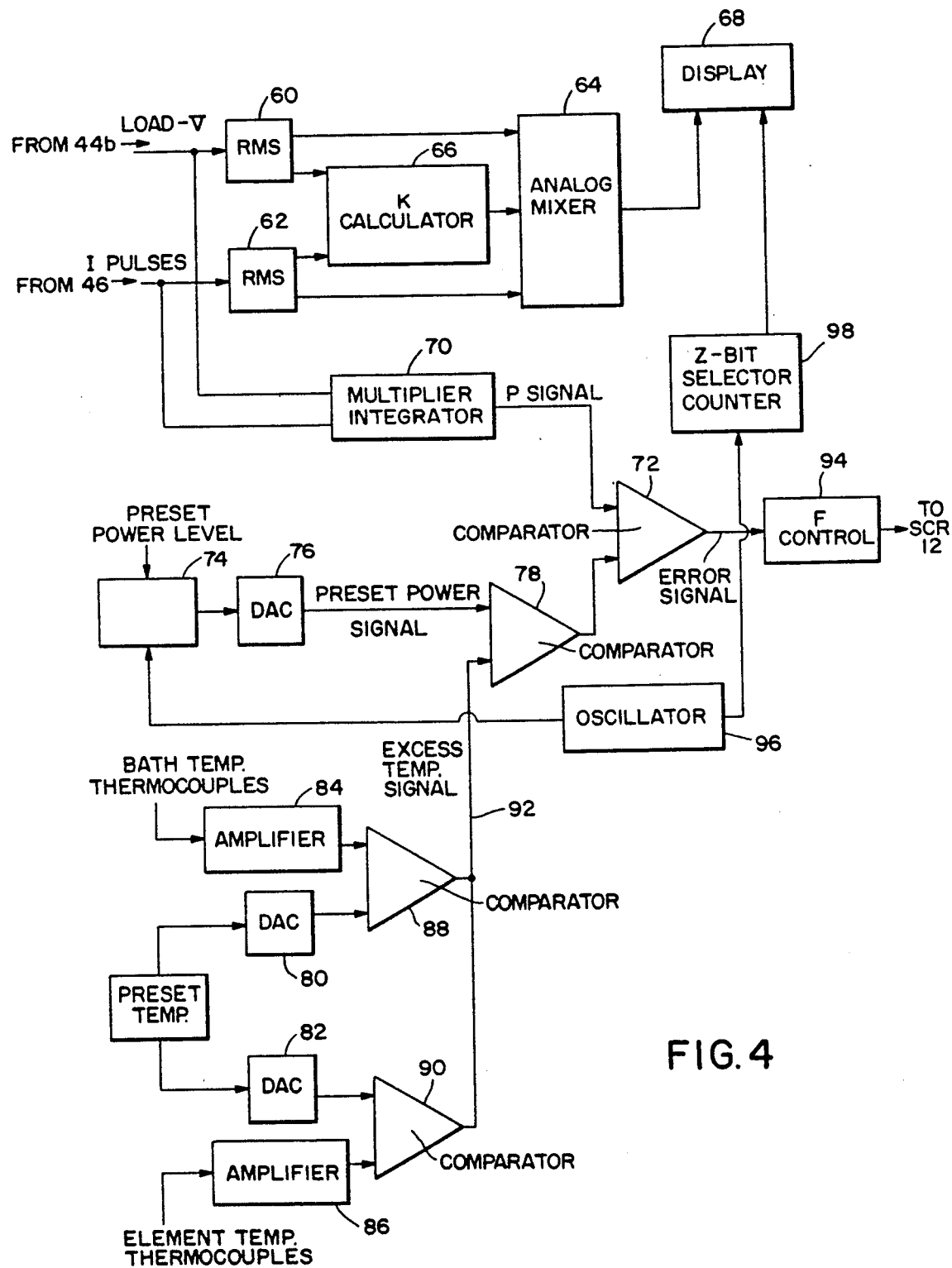
FIG. 4 is a schematic diagram showing one embodiment of a control circuit according to the present invention.

FIG. 4 is a schematic diagram showing one embodiment of control module 50. Signals corresponding to load voltage from sensor 44b and current from current sensor 46 are fed into respective root-mean-square calculators 60, 62. Calculators 60, 62 calculate an RMS value for each parameter and output constant DC voltages proportional to the incoming signals. These proportional signals are sent individually to an analog multiplexer 64, and are also combined in a resistance calculator 66, which performs a division in analog form to determine the value of resistance load 20 at a given time. The signals for voltage, current, and resistance are entered into analog multiplexer 64 to facilitate display to an operator via display means 68.

The values for load voltage and current are also fed directly from the sensors 44b, 46 to a multiplier-integrator 70, which monitors these values over a period of time and multiplies them to produce a DC signal proportional to the power being delivered to the resistance load 20. This power signal is then delivered to comparator 72. In comparator 72, the power signal is compared to an excess power signal, which is a combination of a pre-set desired value for the power to resistance load 20, plus alarm signals which activate should certain other parameters in the resistance furnace, such as bath temperature or element temperature, exceed preset values.

In the preferred embodiment, preset values of power, temperature, and other parameters are entered into the control module 50 digitally, and these digital signals are then converted into analog signals to be fed into comparators. The preset power level, reflecting the desired value of power to the resistance furnace, and selected in consideration of speed, efficiency, and safety, is entered into counter 74. A digital signal from counter 74 is then converted by digital/analog converter 76 to produce a preset power signal, preferably in the form of a flat DC voltage. This preset power signal is then sent to comparator 78.

In an embodiment for the melting of metals, the other input into comparator 78 is an excess temperature signal. The excess temperature signal is usually in the form of an "alarm" signal, in that a signal will be produced only if the temperature being measured exceeds a preset value. For some applications, the actual temperature is not relevant, and temperature is monitored only to determine when it exceeds a safe level. However, within the scope of the invention, the temperature of the bath or the resistance element 20 could be controlled to a specific preset level by means of a feedback loop.

When excess temperature is the only concern, however, the maximum levels for temperature for the molten metal bath and the resistance element 20 itself are fed into digital counters, and these digital values are sent to digital/analog converters 80, 82, to be converted to a proportional DC output. Electronic thermocouples are used to monitor the temperature in the crucible holding the molten metal bath and the resistance element 20, and the signals from these thermocouples are fed into amplifiers 84, 86. The values for the bath temperature and the element temperature are then sent to respective comparators 88, 90 where there are compared to the signals for the preset temperatures. The comparators 88, 90 include rectifiers so that they produce a zero signal if the actual temperature signal is less than the preset value, and produce a positive difference signal if the actual temperature of either the molten metal bath or the resistance element 20 exceeds the preset value. The difference signals from comparators 88, 90 are combined to form an excess temperature signal on line 92. This excess temperature signal is combined with the preset power signal at comparator 78. When either the bath temperature or element temperature, or both, exceeds the preset limit, the excess temperature signal on line 92 will become positive. This positive excess temperature signal will be subtracted from the preset power signal in comparator 78. This subtraction will have the effect of lowering the preset power value, thus lowering the temperature of the resistance furnace. Output from comparator 78, the preset power signal minus the excess temperature signal, is then compared with the actual power signal at comparator 72.

At comparator 72, the output from comparator 78, which represents the desired power signal, is subtracted from the actual power signal from multiplier-integrator 70. If the actual power exceeds the desired power, comparator 72 will produce a positive difference signal; if the desired power is greater than the actual power, the difference signal from comparator 72 will be negative.

The difference signal from comparator 72 is fed into frequency controller 94. Frequency controller 94 produces a train of pulses having a frequency dependent on the voltage of the input. Frequency controller 94 will preferably include a voltage controlled oscillator and a monostable multivibrator, or a "one-shot". In the embodiment described herein, the frequency controller 94 will reduce the frequency (increase the delay time between pulses) if the incoming difference signal is positive, and increase the frequency if the incoming difference signal is negative.

The control module 50 preferably includes detailed display means, so that an operator can be made aware of various conditions having an effect on the control module, such as excess temperature or insufficient power. Means may be provided, such as oscillator 96 and selector counter 98, to monitor various parameters in the system, for example, by means of an interrupt loop.

Depending on the requirements of a specific use, the control module 50 may include means for monitoring many other parameters and conditions besides power and temperature. For example, alarm monitors can be included to detect excess capacitor pressure, semiconductor overheating, cabinet overheating, open doors, voltage on the crucible, run-out, or a broken or shorted thermocouple. Depending on the severity of each of these problems, monitoring systems can be adapted to lower power to the resistance element or shut the system down completely.

The voltage sensors 44a,b are preferably implemented as separate modules. Their function is to measure high voltage and electrically decouple the common potential of this voltage from its supply. For voltages over 1,000 volts, an optical decoupler is preferred. If a voltage sensor requiring a separate DC supply for its operational amplifiers is used, a floating source for the sensors can be obtained with a DC converter, preferably of 7,000 volts isolation.

Figure 5:
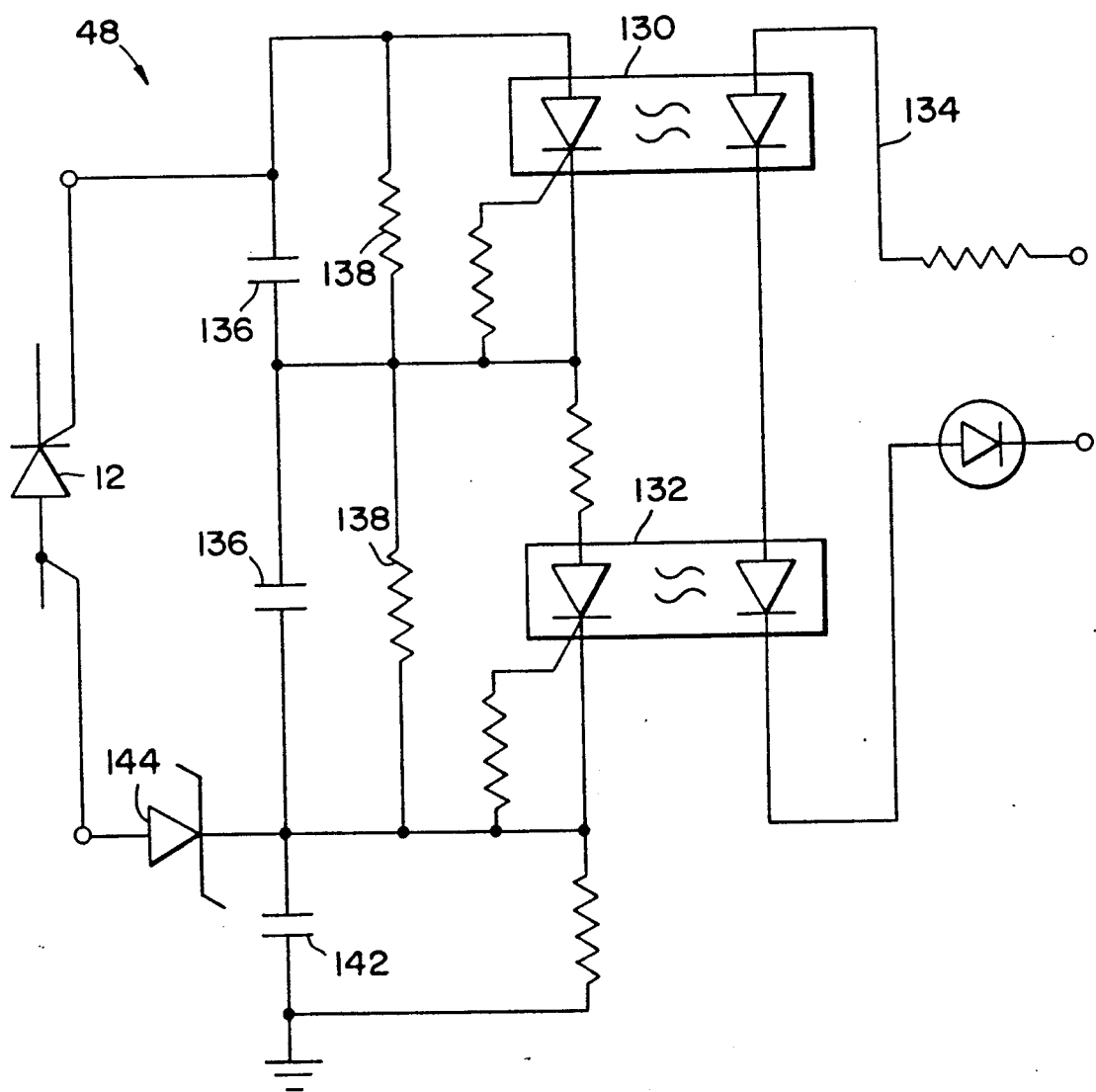
FIG. 5 shows a preferred embodiment of an optoelectronic firing module as used in the present invention.

FIG. 5 is a schematic diagram of a preferred SCR firing module 48. Firing module 48 consists of two parts which are isolated from each other. The low voltage side, on the right of FIG. 6, accepts pulses from control module 50. These pulses pass through the light-emitting diode (LED) portions of optocouples 130, 132. On the right side of each optocouple 130, 132 is an LED connected directly to the control module 50 on line 134. For high voltage applications, it is preferable to use two optocouples in series. On the left hand side of each optocouple 130, 132 is an optically-fired SCR. These SCRs are fired by the emission of light from the LEDs on the right side of each optocouple. When the SCR's are fired, they begin to conduct electricity. Optocouples 130, 132 thus serve to isolate the low voltage and high voltage sections of the firing module. There is no direct electrical connection between the SCR side of each optocouple to the LED side.

The SCR portions of optocouples 130 and 132 complete a circuit by which the main SCR 12 (as in FIG. 1) can be fired. Terminals 140a and 140b are applied to either side of SCR 12. The voltage developed across SCR 12 is applied to capacitors 136 and resistors 138. When the SCR's in optocouples 130, 132 are fired, the current stored in capacitors 136 will be applied to fire SCR 12. Thus, in the preferred embodiment, SCR 12 is fired in response to the pulses from the control module 50. As soon as SCR 12 is fired, the applied voltage in the left portion of the circuit in FIG. 6 drops, turning off the SCRs in optocouples 130, 132. Capacitor 142 is used to absorb any spikes caused by sudden changes of voltage in the firing module circuit. Zener diode 144, having a ten volt barrier potential, prevents any accidental gating caused by the high voltage portion of firing module 48.

The present invention may be embodied in other specific forms without departing from the spirit or essential attributes thereof and, accordingly, reference should be made to the appended claims, rather than to the foregoing specification, as indicating the scope of the invention.

I claim:

1. A method controlling the power supplied to a resistive load, comprising the steps of:
    (a) supplying power at a predetermined current directly from a source to the load for a predetermined interval;
    (b) simultaneously storing power external to the load;
    (c) interrupting the power supplied directly to the load at the end of the predetermined interval;

(d) supplying the stored power to the load at a current greater than the predetermined current substantially immediately following the predetermined interval; and (e) repeating steps (a) through (d) following a controllably variable delay time after the stored power has been supplied to the load.

2. Method as in claim 1, wherein the controllably variable delay time is determined by control means sensitive to average power being delivered to the resistance load.

3. Method as in claim 1, further comprising the steps of:

(a) measuring the average values of voltage and current components of the power supplied to the resistance load;

(b) calculating from the measured values of voltage and current an average power;

(c) combining with a preselected desired power level at least one alarm signal adapted to alter the preset power signal in response to an external condition;

(d) deriving a control signal based on the difference between the actual power and the preselected power level, and the at least one alarm signal; and (e) determining the length of the delay time, based on the control signal.

4. Method as in claim 3, wherein the at least one external condition for triggering the alarm signal comprises element temperature in excess of a preselected maximum.

5. Method as in claim 3, wherein the at least one external condition for triggering the alarm signal comprises workpiece temperature in excess of a preselected maximum.

6. Method as in claim 3, wherein the at least one external condition for triggering the alarm signal comprises equipment temperature in excess of a preselected maximum.

7. Method as in claim 3, wherein the at least one external condition for triggering the alarm signal comprises arcing associated with the resistance load.

8. Method as in claim 3, wherein the at least one external condition for triggering the alarm signal comprises a defect in any temperature-sensing means.

9. A method of controlling the power supplied to a resistive load by providing current pulses to the load at a preselected frequency, comprising the steps of:

(a) firing an SCR having an anode and a cathode through an external control, thereby causing DC voltage to pass therethrough;

(b) passing current through the SCR to energy storage means in parallel with the resistive load until the energy storage means is charged to a potential sufficient to turn off the SCR and cause the energy stored in the energy storage means to flow through the resistance load substantially immediately after the SCR turns off; and (c) repeating steps (a) and (b) following a controllably variable time after the stored energy has been supplied to the load.

10. Apparatus for controllably supplying power to a resistive load, comprising:

(a) energy storage means in parallel with the load;

(b) power supply means for supplying power to the load and the energy storage means;

(c) selectably operable switch means in series with the power supply means;

(d) means for selectably closing the switch periodically according to a predetermined frequency to render it conductive, the switch being openable by the energy storage means after a predetermined interval to render the switch non-conductive and cause the energy stored in the energy storage means to be transferred to the load; and (e) means for varying the frequency of switch closing as a function of a preselected level of power to be delivered to the load.

11. Apparatus as in claim 10, wherein the energy storage means includes at least one capacitor and at least one inductor.

12. Apparatus as in claim 10, wherein the selectably operable switch means is an SCR.

* * * * *